(12) United States Patent
Ben-Shaul et al.

(10) Patent No.: US 7,716,307 B1
(45) Date of Patent: May 11, 2010

(54) METHOD AND APPARATUS FOR REDUCING CLIENT-SERVER MESSAGES ASSOCIATED WITH OPENING A FILE

(75) Inventors: Israel Zvi Ben-Shaul, Palo Alto, CA (US); Etay Meiri, Haifa (IL); Shahar Glixman, Kiryat Tivon (IL); Daniel Kaminsky, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1014 days.

(21) Appl. No.: 11/255,816

(22) Filed: Oct. 21, 2005

(51) Int. Cl.
*G06F 15/16* (2006.01)
(52) U.S. Cl. .................... 709/219; 709/225; 709/229
(58) Field of Classification Search ......... 709/217–219, 709/229
See application file for complete search history.

(56) References Cited

U.S. PATENT DOCUMENTS

| | | | |
|---|---|---|---|
| 4,498,142 A | 2/1985 | Advani et al. | |
| 4,916,605 A | 4/1990 | Beardsley et al. | |
| 5,454,108 A | 9/1995 | Devarakonda et al. | |
| 5,483,657 A | 1/1996 | Hatakeyama | |
| 5,555,388 A | 9/1996 | Shaughnessy | |
| 5,560,008 A * | 9/1996 | Johnson et al. | 726/5 |
| 5,596,754 A | 1/1997 | Lomet | |
| 5,682,534 A | 10/1997 | Kapoor et al. | |
| 5,740,367 A | 4/1998 | Spilo | |
| 5,745,747 A | 4/1998 | Chang et al. | |
| 5,956,712 A | 9/1999 | Bennett et al. | |
| 6,182,139 B1 | 1/2001 | Brendel | |
| 6,189,046 B1 | 2/2001 | Moore et al. | |
| 6,282,581 B1 | 8/2001 | Moore et al. | |
| 6,405,274 B1 | 6/2002 | Chan | |
| 6,408,342 B1 | 6/2002 | Moore et al. | |
| 6,567,405 B1 | 5/2003 | Borella et al. | |
| 6,574,654 B1 | 6/2003 | Simmons et al. | |
| 6,667,700 B1 | 12/2003 | McCanne et al. | |
| 6,668,270 B1 | 12/2003 | Simmons et al. | |
| 6,668,295 B1 | 12/2003 | Chan | |

(Continued)

OTHER PUBLICATIONS

Leach, Paul et al., "CIFS: A Common Internet File System," MSDN, Microsoft Internet Developer, published Nov. 1996, located on the internet at http://www.microsoft.com/mind/1196/cifs.asp, 11 pages.

(Continued)

*Primary Examiner*—Joseph E Avellino
*Assistant Examiner*—Jackie Zuniga
(74) *Attorney, Agent, or Firm*—Hickman Palermo Truong & Becker LLP

(57) ABSTRACT

A method is disclosed for reducing client-server messages. A first request to open a file is received. The first request includes first information that indicates a first access mode for opening the file. The first information is modified to indicate a most extended access mode for opening the file. The first request with the modified first information is sent to a file server that manages access to the file. A first response is received. The first response comprises second information which indicates a specific access mode for opening the file that is granted by the file server. The second information is stored in a cache. In response to a second request to close the file, the closing of the file is delayed.

30 Claims, 4 Drawing Sheets

U.S. PATENT DOCUMENTS

| | | | |
|---|---|---|---|
| 6,828,925 | B2 | 12/2004 | McCanne et al. |
| 7,047,299 | B1 | 5/2006 | Curtis |
| 7,047,536 | B1 | 5/2006 | Duncan et al. |
| 7,116,249 | B2 | 10/2006 | McCanne et al. |
| 7,139,811 | B2 | 11/2006 | Lev Ran et al. |
| 7,299,282 | B2 | 11/2007 | Sarkissian et al. |
| 7,424,722 | B2 | 9/2008 | Joseph |
| 2002/0019874 | A1* | 2/2002 | Borr .......................... 709/229 |
| 2003/0009480 | A1* | 1/2003 | Lin et al. .................... 707/200 |
| 2003/0018785 | A1 | 1/2003 | Eshel et al. |
| 2003/0018878 | A1 | 1/2003 | Dorward et al. |
| 2003/0195937 | A1 | 10/2003 | Kircher et al. |
| 2004/0088376 | A1 | 5/2004 | McCanne et al. |
| 2004/0168057 | A1 | 8/2004 | Margolus et al. |
| 2004/0168058 | A1 | 8/2004 | Margolus |
| 2004/0174276 | A1 | 9/2004 | McCanne et al. |
| 2004/0215746 | A1* | 10/2004 | McCanne et al. ........... 709/219 |
| 2004/0243703 | A1 | 12/2004 | Demmer et al. |
| 2005/0125553 | A1 | 6/2005 | Wu et al. |
| 2005/0273792 | A1 | 12/2005 | Inohara et al. |
| 2006/0009213 | A1 | 1/2006 | Sturniolo et al. |

OTHER PUBLICATIONS

Storage Networking Industry Association, "Common Internet Filed System (CIFS) Technical Reference—Revision: 1.0," SNIA Technical Proposal, Release Date Mar. 1, 2002, pp. i-xi, 1-138.

Academic Press Dictionary of Science and Technology, Oxford: Elsevier Science and Technology 1992, retrieved Aug. 13, 2008. (Copy of reference was not provided by USPTO with the 50325-1049 office action so no copy has been enclosed with this IDS).

Muller et al. "Fast, Optimized Sun RPC Using Automatic Program Specialization", 1998 IEEE, 10 pages.

Zelesko et al. "Specializing Object-Oriented RPC for Functionality and Performance", 1996 IEEE, pp. 175-187.

Narender et al. "Dynamic RPC for Extensibility", 1992 IEEE, pp. 93-100.

* cited by examiner

METHOD AND APPARATUS FOR REDUCING CLIENT-SERVER MESSAGES ASSOCIATED WITH OPENING A FILE

FIELD OF THE INVENTION

The present invention generally relates to client-server communications. The invention relates more specifically to a method and apparatus for reducing client-server messages associated with opening a file.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Geographically dispersed enterprises often deploy distributed computer systems in order to enable information sharing throughout the enterprise. Such distributed systems generally comprise an enterprise network, which includes a number of Local Area Networks (LANs) that are connected over one or more Wide Area Network (WAN) communication links. An enterprise network generally includes one or more servers that store enterprise information in one or more data resources. The servers supply the data from the resources upon receiving requests for the data from other enterprise servers or clients, which servers or clients may be established in the LAN that is local to the data resource or may be established in a LAN that is located across the WAN.

For example, the business structure of an enterprise may comprise a main office, and one or more branch offices. To support this business structure, the enterprise typically employs a local LAN for each of the main and branch offices, and one or more WAN communication links that connect the LANs at the branch offices with the LAN at the main office. This network infrastructure enables users at the branch offices, who run software applications locally on their workstations, to access files that are located at the main office.

While this network infrastructure allows for greater sharing of information for users throughout the enterprise, it also has a significant disadvantage because software applications that access files are primarily designed to access the files over a relatively high-speed LAN. Usually, significant latency and performance degradation are observed when a software application opens a file that is located across the WAN in a remote LAN. In a typical example, an enterprise user in a branch office uses a word-processor application to open and modify files. The user is able to open files that are in the LAN local to the user relatively quickly, while opening files that are located across the WAN in a remote LAN is slow and sometimes unreliable.

One of the reasons for the above-described performance degradation is the high number of messages exchanged over the WAN communication link between a file server that manages a file and a client that executes an application that attempts to open the file. A typical file open operation requires the client application and the file server to exchange a series of messages before the file server grants access to the file. When the client on which the client application executes and the file server are coupled over a WAN communication link, the network latency introduces undesirable or even unacceptable delay in completing the file open operation because of the time needed to communicate the series of messages over the communication link. Even if the WAN communication link has sufficient bandwidth, the WAN latency still causes the file open operation to be slow. As a result, the response times for the user are too high.

Furthermore, some client applications use a synchronous series of messages to perform file open operations, that is, the client applications do not send the next message until the response from the previous message has been received. This creates a further delay in opening the file. During the time in which a client application is waiting to send the next message, the communication link between the client and the file server is underutilized, which in turn may delay the transfer of any other data between the client and the file server. This problem is exacerbated when the client application performs a burst of file open and file close operations in a rapid succession as part of the same user session. The number of messages between the client and the file server increases when the number of file open and file close operations performed by the client application increase.

The above-described performance problems caused by the high number of exchanged messages are not unique to WAN communication links. Similar problems of high latency and high response times are observed by client applications that transfer data over other low bandwidth and/or high latency communication links, such as, for example, dial-up connections, Digital Subscriber Line (DSL) connections, and Integrated Services Digital Network (ISDN) connections.

One past approach for reducing the number of messages exchanged between a client application and a file server while opening a file is the Batch Oplocking mechanism of the Common Internet File System (CIFS) protocol. Batch Oplocking allows the client to skip extraneous file open and file close operations requested by a client application. For example, when a client application executing on Client A opens a file on a file server, Client A may request a batch oplock from the file server. The batch oplock is a lock on the file that is maintained by the file server. Provided that the file is not open at the file server by any other client, the file server grants the batch oplock to Client A. Client A then may keep the file open on the file server for the client application across multiple file open and file close operations performed by the application. When another client, Client B, requests from the file server to perform any file operation on the file, the file server notifies Client A. At this point, Client A must release the batch oplock and must synchronize the file with the file server. In addition, if the client application believes that the file is actually closed (for example, when the last request from the client application to Client A was a file close operation), Client A must also close the file on the file server.

The Batch Oplocking mechanism has numerous significant disadvantages. One disadvantage is that the batch locks granted by the file server correspond to the exact type of the access request issued by the client application. If the same client application later requests a different type of access to the file, the file server must break the granted batch oplock, and must issue a new batch oplock that corresponds to the type of the new request. For example, if the original request from the client application was only to modify the attributes of the file, and the subsequent request was to read data from the file, the file server must revoke any batch oplock that was granted along with the response to the original request. In this way, the same client application effectively looses its own batch oplock on the file in response to its own subsequent request, which does not result in any significant reduction in the number of messages exchanged between the client and the file server.

Another disadvantage of the Batch Oplocking mechanism is that once a client loses a batch oplock on a file granted by a file server, the client cannot regain the oplock while the client is holding the file open. The client must close the file on the file server, and must request a new batch oplock using a new file open request. The server will grant the new oplock only if no client (including the client that broke the previous batch oplock) is holding the file open. This makes the obtaining of a batch oplock a "one shot" mechanism after which the process for obtaining a new batch oplock must be restarted, and this process does not result in any significant reduction in the number of messages exchanged between the client and the file server.

Another disadvantage is that the Batch Oplocking mechanism is opportunistic, that is, a client must release its batch oplock on the file and/or close the file as soon as another client requests to perform an operation affecting the file. For example, the file server must notify a client that holds a batch oplock, and must break the oplock when another client attempts to rename or delete the file or attempts to rename or delete the file's parent directory. This process not only does not result in any reduction in the number of messages exchanged between the client and the file server, but actually increases the number of exchanged messages because the file server needs to send extra messages to notify clients holding batch oplocks on a file when other clients attempt to perform operations affecting the same file.

Based on the foregoing, there is a clear need for a technique of reducing client-server messages associated with opening a file that overcomes the problems described above and the disadvantages of the described past approach.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
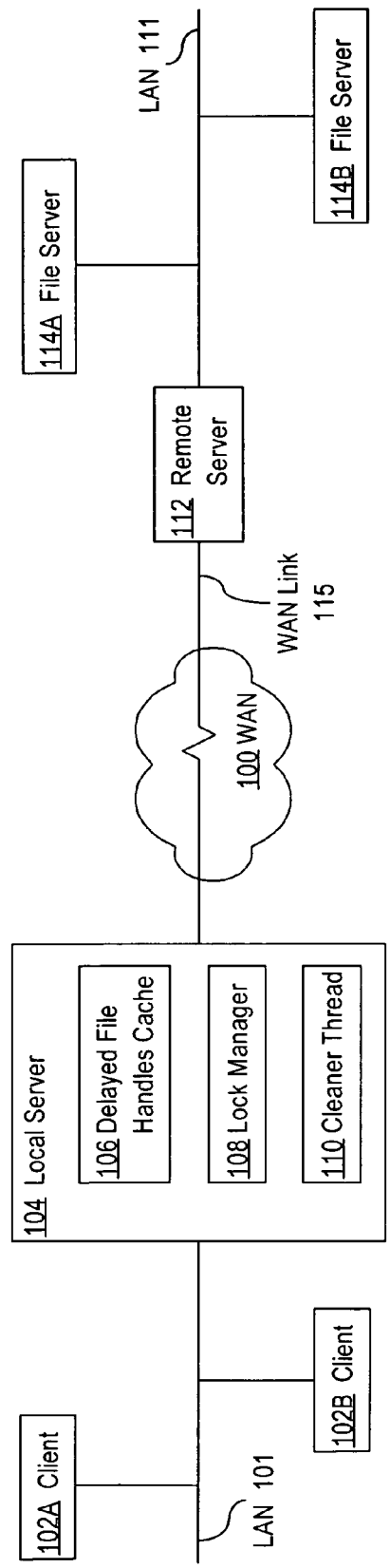
FIG. 1 is a block diagram that illustrates an overview of an example operational context in which an embodiment may be implemented.

A method and apparatus for reducing client-server messages is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Method of Reducing Client-Server Messages
      3.1 Reducing Client-Server Messages
      3.2 Extended Access Modes, Global and Local Coherency Share Modes
      3.3 Opening a File in an Extended Access Mode
      3.4 Opening a File Locally-Nested Open
      3.5 Opening a File in a Least Restricted Access Mode
   4.0 Implementation Mechanisms—Hardware Overview
   5.0 Extensions and Alternatives 1.0 General Overview The needs identified in the foregoing Background, and other needs and objects that will become apparent for the following description, are achieved in the present invention, which comprises, in one aspect, a method for reducing client-server messages. A first request to open a file is received. The first request includes first information that indicates a first access mode for opening the file. The first information is modified to indicate a most extended access mode for opening the file. The first request with the modified first information is sent to a file server that manages access to the file. A first response is received. The first response comprises second information which indicates a specific access mode for opening the file that is granted by the file server. The second information is stored in a cache. In response to a second request to close the file, the closing of the file is delayed.

In a feature of this aspect, the most extended access mode identifies a largest set of types of operations. The largest set of types of operations is among a plurality of sets ranging from extended to restricted. The types of operations in the largest set are types of operations that are allowed to be performed on the file after the file is opened. In this feature, the specific access mode is the most extended access mode.

In one feature of the aspect, the first access mode identifies a first set of types of operations that are allowed to be performed on the file after the file is opened. The specific access mode identifies a specific set of types of operations that are allowed to be performed on the file after the file is opened. The specific set of types of operations includes at least the first set of types of operations. In this feature, the file is opened at the file server in the specific access mode.

In a feature of this aspect, a second response is created. The second response indicates that the file is closed even though the closing of the file has been delayed. In response to the second request to close the file, the second response is sent.

In one feature of the aspect, a third request to open the file is received. A determination is made whether the file is still open at the file server by determining whether the second information is still stored in the cache. If it is determined that the file is still open, then the third request is responded to by creating and sending a third response. The third response is based at least in part on the second information.

In this feature, the third request may include third information that indicates a second access mode for opening the file, where the second access mode is different than the first access mode. Each of the first access mode, the second access mode, and the specific access mode identifies a set of types of operations that are allowed to be performed on the file after the file is opened in that access mode. When the set of types of operations identified in the second access mode is included in the set of types of operations identified in the specific access mode, then the third response indicates that the file is opened in the second access mode.

In this feature, the first request to open the file, the second request to close the file, and the third request to open the file may be associated with a user of a client that sent the first request, the second request, and the third request. The second information is associated in the cache with an identifier of the user, and the determination whether the second information is still stored in the cache is based at least in part on the identifier of the user.

In one feature of the aspect, the closing of the file is delayed for a specified interval of time. The specified interval of time may be pre-determined and may represent an interval of time during which no requests to open the file have been received. In this feature, the method further comprises closing the file on the file server after the specified interval of time expires.

In a feature of this aspect, the steps of the method may be preformed by any one of a client and a server.

Another aspect comprises a method for reducing client-server messages. A first request to open a file is received at a local server from a client. The first request includes a first access mask that indicates a first access mode of a plurality of access modes for opening the file. The file may be accessed through a remote server that is connected to the local server over a communication link. The first access mask is modified to indicate a most extended access mode from the plurality of access modes for opening the file. The first request with the modified first access mask is sent to the remote server. A first response is received from the remote server. The first response comprises a first file handle to the file, which first file handle is associated with a specific access mode of the plurality of access modes for opening the file. The first file handle is stored in a cache. In response to a second request from the client to close the file, the closing of the file is delayed.

In a feature of this aspect, a second response is created. The second response indicates that the file is closed even though the closing of the file has been delayed. In response to the second request to close the file, the second response is sent to the client.

In one feature of the aspect, a third request to open the file is received from the client. A determination is made whether the file is still open by determining whether the first file handle is still stored in the cache. If it is determined that the file is still open, then the third request is responded to by creating and sending a third response. The third response includes at least a second file handle that is created based on the first file handle.

In this feature, the third request may include a second access mask that indicates a second access mode of the plurality of access modes for opening the file, where the second access mode is different than the first access mode. Each of the plurality of access modes identifies a set of types of operations that are allowed to be performed on the file after the file is opened in that access mode. When the set of types of operations identified in the second access mode is included in the set of types of operations identified in the specific access mode, then the second file handle indicates that the file is opened in the second access mode.

In this feature, the first request to open the file, the second request to close the file, and the third request to open the file may be associated with a specific user of one or more users of the client. The first file handle is associated in the cache with at least a user identifier of the specific user and a client identifier of the client. The determination whether the first file handle is still stored in the cache is based at least in part on the user identifier and the client identifier.

In one feature of the aspect, the closing of the file is delayed for a specified interval of time. The file is closed on the file server after the specified interval of time expires, and the first file handle is removed from the cache.

In a feature of this aspect, the first request to open the file and the second request to close the file are associated with a specific user of the client. The first request further includes a first data that indicates that no user except the specific user is allowed to perform any operation on the file until the file is closed.

In one feature of the aspect, the client is a first client of a plurality of clients that are communicatively connected to the local server. The first request to open the file and the second request to close the file are sent from the first client. In this feature, the first request comprises a first share mask that indicates a first share mode for opening the file, and a first data that indicates that users of the plurality of clients are allowed to share the file according to the first share mode.

In a feature of this aspect, the communication link between the local server and the remote server is any one of a dial-up connection, a Wide Area Network (WAN) connection, a Digital Subscriber Line (DSL) connection, and an Integrated Services Digital Network (ISDN) connection. The client is communicatively connected to the local server over a first Local Area Network (LAN) connection. The remote server is communicatively connected to a file server over a second LAN connection, wherein the file server manages access to the file.

In one feature of the aspect, the remote server is communicatively coupled to a file server that manages access to the file. The remote server determines the specific access mode by successively requesting the file server to open the file in successively different access modes until the file server successfully opens the file. The successive requesting comprises starting with the most extended access mode and proceeding to the next least restricted access mode in the plurality of access modes that has not yet been requested. The one access mode in which the file is opened successfully is identified as the specific access mode. If all attempts to open the file, from the most extended access mode the most restricted access mode, have failed, the final attempt to open the file is performed using the access mode that was originally requested from the client. This guarantees that extending the access mode will not lead to the client not being able to open the file.

In other aspects, the invention encompasses a computer apparatus and a computer-readable medium configured to carry out the foregoing steps.

2.0 Structural and Functional Overview

FIG. 1 is a block diagram that illustrates an overview of an example operational context in which an embodiment may be implemented.

Local Area Network (LAN) 101 is communicatively connected to LAN 111 over Wide Area Network (WAN) 100. One or more clients, such as clients 102A and 102B, are communicatively connected over LAN 101 to local server 104. Local server 104 acts as a proxy and provides access to LAN 111 for one or more clients on LAN 101. Local server 104 is also communicatively connected, over WAN 100, to remote server 112 via WAN link 115.

Local server 104 comprises delayed file handles cache 106, lock manager 108, and cleaner thread 110. Delayed file handles cache 106 stores handles for files the closing of which was delayed in accordance with the techniques described herein. Lock manager 108 stores the current state of locks for every file that is opened by a client for which local server 104 acts as a proxy. When local server 104 performs a delayed close of a file in accordance with the techniques described herein, it may use lock manager 108 in order to unlock any regions of the file that a client may have locked. For example, a client may send lock requests for regions in an open file. (The lock requests may be used for synchronization purposes by applications running on the client.) Lock manager 108 registers all locked regions associated with a file handle. When a client requests to close the file indicated by the file handle and local server 104 decides to delay the closing of the file, local server 104 sends a set of unlock requests to the file server managing access to the file in order to unlock any locked regions in the file. In this way, local server 104 guarantees that all implications related to closing the file, such as unlocking locked regions, are fulfilled. In addition, in this embodiment a subsequent client request to close a file handle is an implicit request to local server 104 to unlock all locked regions in the file.

Cleaner thread 110 is an execution entity that periodically closes files for which the file handles stored in delayed file handles cache 106 have expired. In some embodiments the cleaner thread may be implemented as a thread of a process that executes on the local server. In other embodiments, the cleaner thread may be a process, service, or a stand-alone application that executes on the local server or on another entity in the local LAN.

Remote server 112 is communicatively connected over LAN 111 to one or more servers, such as file servers 114A and 114B. A file server, such as, for example, file server 114A, manages access to one or more files that may be stored in a local or network file system.

In operation, local server 104 intercepts a request to open a file located in remote LAN 111 from a client on the local LAN 101, such as, for example, client 102A. The intercepted request is sent from client 102A to a file server that manages the file in remote LAN 111, such as, for example, file server 114A. The request to open the file includes an access mask that indicates an access mode for opening the file.

An access mode for opening a file generally indicates the types of operations that can be performed on the file. Depending on the types of file operations available in different file systems, different embodiments may group file operations in access modes differently. Typically, however, the set of access modes supported in an embodiment would include some access modes that are more extended and less restricted than other access modes. The more extended access modes generally identify a larger set of operation types that are allowed, and a smaller set of operation types that are prohibited. The more restricted access modes generally identify a smaller set of operation types that are allowed, and a larger set of operation types that are prohibited.

After receiving the request to open the file from client 102A, local server 104 modifies the access mask included in the request to indicate the most extended access mode in which the file can be opened by file server 114A. Local server 104 then sends the request to open the file with the modified access mask to remote server 112. Remote server 112 receives the request to open the file, and sends it to file server 114A. If file server 114A fails to open the file in the most extended access mode requested by remote server 112, remote server 112 sends to file server 114A a request to open the file in the next least restricted access mode. This process of reducing the extended access mode and attempting to open the file in the newly reduced access mode may be repeated multiple times until file server 114A opens the file, where the last attempt to open the file will be by using the original access mode requested by client 102A. This procedure of opening the file is fast because remote server 112 and file server 114A communicate over the high-speed LAN 111.

File server 114A eventually opens the file in a specific access mode. The specific access mode indicates a set of operation types that is as extended as far as file server 114A would allow, and may or may not be as extended as the most extended access mode specified by the modified access mask. In any event, the specific access mode should be as extended as at least the original access mode requested by client 102A; otherwise, an error will be returned the client. File server 114A then returns a file handle to the opened file to remote server 112, and remote server 112 sends the received file handle to local server 104.

Upon receiving the file handle from remote server 112, local server 104 stores the received file handle in delayed file handles cache 106. Based on the received file handle, local server 104 creates a second file handle and associates it with the received file handle. The second file handle indicates that the file is opened in the original access mode requested by client 102A in the original request. Local server 104 then includes the second file handle in a response message and sends the message to client 102A.

At this point, client 102A knows that the file is opened in the originally requested access mode. Client 102A then proceeds to perform one or more file operations on the file. For example, when client 102A wants to perform a particular file operation, client 102A creates a request that is to be sent to file server 114A. The request identifies the particular file operation. The request also includes the second file handle that identifies the opened file. Client 102A then sends the request to file server 114A. Local server 104 intercepts the request and substitutes the second file handle with the received handle that is stored in delayed file handles cache 106. The modified request is sent through remote server 112 to file server 114A. File server 114A performs the particular file operation on the file and returns a response to remote server 112. Remote server 112 sends this response to local server 104, which sends the response back to client 102A.

At some point, client 102A completes the operations it needs to perform on the file, and sends a request to file server 114A to close the file. Local server 104 intercepts the request. Instead of sending the request to file server 114A to close the file, local server 104 delays the closing of the file. Local server 104 creates a response that indicates that the file is closed even though the file is not actually closed by file server 114A. Local server 104 then sends this response to client 102A, and at this point from the perspective of client 102A the file is closed, even though the file is still opened at file server 114A. In this way, by responding locally to the request to close the file, local server 104 saves one roundtrip of client-server messages exchanged over the slow WAN link 115.

When receiving a request to close a file from a client, such as client 102A, local server 104 may read locked regions status for the file from lock manager 108 and may send unlock requests to file server 114A. Further, in this embodiment some file operations performed by a client may implicitly close file handles, such as, for example, IPC$ tree disconnect operation, logoff operation, and client socket disconnect operation. Upon receiving a request for such operation, in this embodiment local server 104 may remove the appropriate entries from delayed file handles cache 106 and lock manager 108 before sending the request for the operation to file server 114A.

Suppose that thereafter client 102A wants to open the same file on file server 114A. Client 102A sends to file server 114A a request to open the file. The request may include an access mask that indicates an access mode for opening the file. Local server 104 intercepts the request, and determines whether the file is still opened on file server 114 by determining whether delayed file handles cache 106 still stores a file handle to the file. If local server 104 determines that the file is still open, instead of transmitting the request to open the file to remote server 112 over the slow WAN link 115, local server 104 responds to the request locally. Based on the file handle stored in delayed file handles cache 106, local server 104 creates a second file handle to the file and sends it in a message to client 102A. In this way, by responding with information from delayed file handles cache 106, local server 104 saves at least one roundtrip of client-server messages over the slow WAN link 115. Further, a roundtrip of client-server messages over the slow WAN link 115 may also be saved when a client requests to open a file in an access mode that is more extended than the access mode that file server 114A would allow. For example, the local server can determine, based on the file handle stored in the delayed file handles cache, whether a client is requesting to open a file in an access mode that a file server would not allow, and if that is the case then the local server may deny the request locally without exchanging any messages with the remote server or the file server over the slow WAN link.

Local server 104 periodically invokes cleaner thread 110 in order to close any files for which the closing has been delayed but for which no file open request has been received from clients on LAN 101 for a specified interval of time. Each file handle in delayed file handles cache 106 is associated with a usage counter, which indicates the number of times that the file handle is currently in use by a client. When invoked, cleaner thread 110 traverses the file handles in delayed file handles cache 106, and identifies the file handles for which the specified interval of time has expired and which are not in use. For each file associated with an expired file handle identified in this manner, cleaner thread 110 creates a file close request, sends the file close request to the file server managing that file in order to close the file, and removes the expired file handle from delayed file handles cache 106. In alternative embodiments, the file handles in delayed file handles cache 106 may be separated into two pools: used pool and unused pool. In these embodiments, local server 104 may move handles between the pools based on the clients' open and close requests, and cleaner thread 110 may traverse only the unused pool in order to determine which file handles have expired.

Embodiments of the techniques described herein may be implemented in operational contexts and/or in systems that are different than the operational context and the system depicted in FIG. 1. For example, in one embodiment, a client may perform the steps performed by the local server described above. In this embodiment, the client may be connected to the remote server over a dial-up connection, DSL, an ISDN line, or any other type of slow or relatively slow communication link. In addition, a file server may perform the steps performed by the remote server as described above, and any client that is configured to perform the techniques described herein may be connected directly to that file server.

Furthermore, in addition to caching file handles of files opened by a file server, in some embodiments the local server may also cache any other information that is included in the responses from the file server. In these embodiments, the local server may respond to any subsequent requests from the client for the file by using the cached information, thus saving roundtrip messages over the slow communication link. For example, the techniques described herein may be used by clients that send file open and file close requests to a remote file server in sequences of repeated bursts. When a client executes a sequence of a file open and a file close request for the first time, the local server delays the closing of the file and caches information that is received in the responses from the file server. If the same or another client thereafter invokes a second sequence of file open and a file close requests, the local server may respond without sending any of the requests over the slow communication link by locally creating responses using the cached information. Thus, the file server response information from the execution of the first sequence of file open and file close requests is used to handle locally the next sequence of file open and file close requests.

In some embodiments, the caching operations described herein may be implemented through mechanisms other than mechanisms at local server 106, e.g., through mechanisms at any client, such as clients 102A and 102B.

In some embodiments, the remote server itself may provide access to files that are stored in a network file system that is mounted by the remote server. In these embodiments, the remote server may perform the steps performed by the file server as described above. In addition, different embodiments may include any number of clients, local servers, remote servers, and/or file servers. Thus, the techniques and approaches described herein are not limited to any particular operational context or system, and the operational context and the system depicted in FIG. 1 are to be regarded in an illustrative rather than a restricted sense.

Figure 2A:
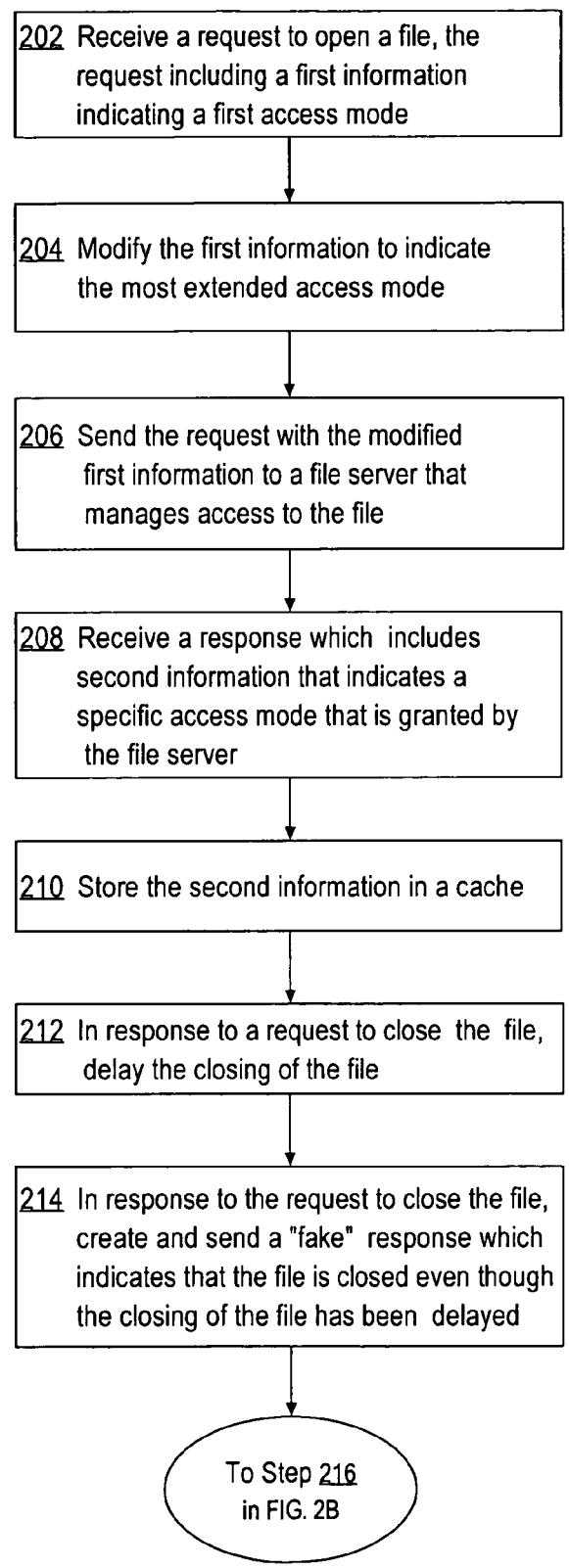
FIG. 2A is a flow diagram that illustrates a high level overview of one embodiment of a method for reducing client-server messages.
Figure 2B:
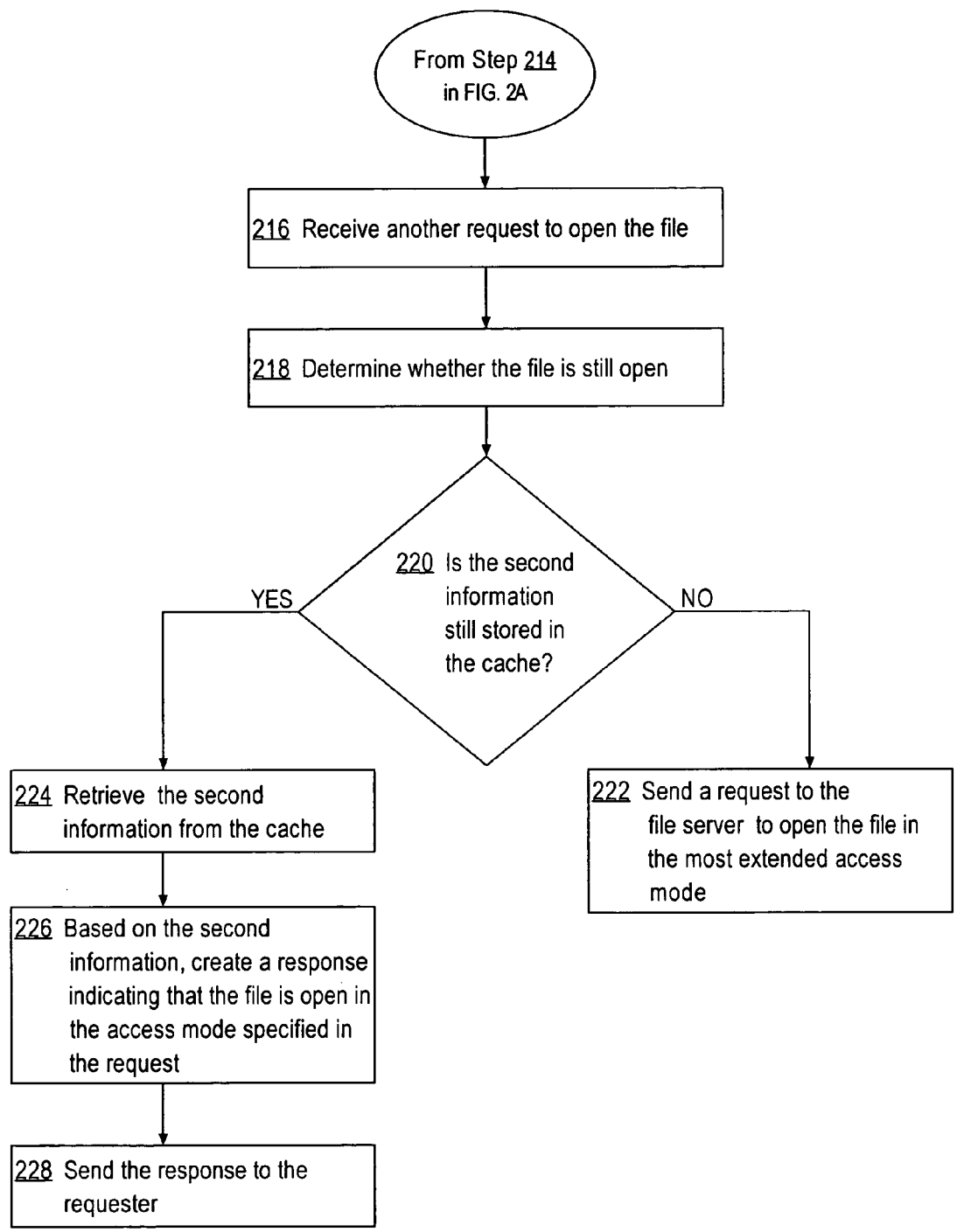
FIG. 2B is a continuation of the flow diagram in FIG. 2A.

3.0 Method of Reducing Client-Server Messages 3.1 Reducing Client-Server Messages FIGS. 2A and 2B depict a flow diagram that illustrates a high level overview of one embodiment of a method for reducing client-server messages. In this embodiment, client-server communications are optimized by reducing the number of roundtrip requests and responses between a client and a remote file server.

In one embodiment, the steps of the method illustrated in FIGS. 2A and 2B are performed by a local server on a LAN that is local to the client that requests to open a file at a file server. The file server is established in a LAN that is remote to the client and that is communicatively connected to the local LAN over a slow communication link. In other embodiments, the client or any other entity proximate to the client may perform these steps.

Referring to FIG. 2A, in step 202 the local server receives a request to open a file from a client, where the file is managed by a file server in a remote network. The request includes first information indicating a first access mode. In step 204, the local server modifies the first information to indicate the most extended access mode in which the file server can open the file. The most extended access mode identifies the largest set of types of operations, from a plurality of available sets, which are allowed to be performed on the file.

In step 206, the local server sends the request to the file server that manages access to the file. In some embodiments, the request to open the file may be sent directly to the file server; in other embodiments, the request may be sent to a remote server in the remote network, which remote server provides a proxy access to the file server. The request includes the modified first information that indicates the most extended access mode. In some embodiments, the request may also include the original first information that indicates the original access mode.

In step 208, the local server receives a response that includes second information that indicates a specific access mode that is granted by the file server. In some embodiments, the specific access mode is the most extended access mode indicated in the modified first information. In these embodiments, if the file server is not able to grant the requested most extended access mode, the file server returns an error indicating that the file cannot be opened. In other embodiments, if the file server is not able to grant the requested most extended access mode, the file server may return an error. In these embodiments, the local server (or the remote server) may attempt again to open the file in a less extended access mode, and this process may be repeated several times until the most restricted access mode acceptable to the client has been attempted. Further, in these embodiments if the file server is not able grant the access mode requested by the client in the original request, an error may be returned to the client indicating that the file cannot be opened.

In step 210, the local server stores in a cache the second information that is received in the response from the file server. In some embodiments, the second information is stored in the cache on a per-user basis. In this embodiment, each file opened by a client at the remote file server is associated with a particular user of the client. The user is identified by a User ID (UID). The local server stores in the cache the UID of the particular user and the Client ID of the client in association with the second information received in the response from the file server. In other embodiments, a client is not able to multiplex several users on the same transport connection that is established between the client and the local server. In these embodiments, the second information is stored in the cache on a per-client basis, where the second information is associated with a Client ID of the client that requested to open the file.

After storing the second information in the cache, the local server sends a response to the client. The response notifies the client that the file is open and that the client may proceed with performing operations on the file. In some embodiments, the response to the client may indicate that the file is opened in the original access mode requested by the client. In these embodiments, the operations which the client will be allowed to perform on the file must be of types that are in the set of types of operations indicated by the original access mode. In other embodiments, the response to the client may indicate that the file is opened in the specific access mode indicated in the response from the file server. In these embodiments, the operations which the client will be allowed to perform on the file must be of types that are in the set of types of operations indicated by the specific access mode in which the file is opened at the file server.

After completing its file operations, the client sends a request to close the file. In step 212, the local server receives the request to close the file, and in response delays the closing of the file. In some embodiments, the delay may be in the order of milliseconds. In other embodiments, the delay may be seconds or even minutes. The delay in closing the file may be for a specified interval of time that is configurable by an administrator of the local server. The interval of time for which the closing of the file is delayed by the local server may further depend at least in part on the pattern of file open/file close requests issued from a client, or on the pattern of accessing that particular file by any client or user.

In step 214 the local server creates a "fake" file close response, which indicates that the file is closed even though the closing of the file has been delayed and the file is still open at the file server. The local server then responds to the request to close the file by sending the "fake" file close response to the client. In this context, "fake" means that while in fact the file is still open, the file close response indicates to the client that the file is closed. The "fake" file close response is used to notify the client that the request to close the file has succeeded, so that the client may notify accordingly the client application on whose behalf the file was opened. The ability of the local server to create "fake" file close responses allows the local server to reduce the exchanged roundtrip client-server messages without requiring that clients change their file-open or file-close semantics.

Referring to FIG. 2B, in step 216 the local server receives a subsequent request from a client to open the same file. The subsequent request to open the file may be from the same client that previously opened the file. In step 218, the local server determines whether the file is still open at the file server. By checking the contents of the cache, in step 220 the local server may determine whether the cache stores a second information that indicates that the file is still open at the file server in the specific access mode. If the cache does not store any such second information, the local server treats the subsequent request to open the file as a new request and in step 222 sends a request to the file server to open the file in the most extended access mode.

If in step 220 the local server determines that the cache stores a second information that indicates that the file is open at the file server in the specific access mode, then in step 224 the local server retrieves the second information from the cache. Based on the second information, in step 226 the local server creates a response that indicates that the file is open in the access mode specified in the subsequent request. In step 228, the local server sends the created response to client, thus notifying the client that the file is opened. In some embodiments, the local server may keep a reference count that is associated with the second information. In these embodiments, the reference count is incremented every time the local server sends a response indicating that the file is opened, and is decremented every time the local server receives a request to close the file. In this way, local server may keep track of how many clients have the file open, and may close the file only when the reference count is zero, that is, when no client has the file open.

Thus, in completing the subsequent request from a client to open the file, there are no messages exchanged between the local server and the file server. When the local server and the file server are located in different LANs that are connected over a slow WAN link, the exchange of two roundtrip messages over the slow WAN link was avoided. In this particular embodiment, the techniques for reducing client-server messages described herein resulted in a 100% reduction of exchanged file open requests and file open responses. In processing the subsequent file open request, there was no need to exchange any messages with the file server over the slow WAN link because all the information needed by the client was cached at the local server, and all necessary responses were locally created and sent to the client by the local server.

In some embodiments, the subsequent request to open the file may indicate an access mode that is different than the original access mode indicated in the original file open request for which a response from the file server was cached. For example, the original file open request may have requested to read from and write to the file, while the subsequent request to open the file may request to change some permissions associated with the file. In these embodiments, since after receiving the original file open request the local server requested that the file server open the file in the most extended access mode (which allows operations that change the various permissions of the file), in response to the subsequent request to open the file the local server may create a response based on information in the cache, which response indicates that the file is opened in an access mode that allows changes to the permissions of the file. Thus, in these embodiments the reduction in client-server messages associated with opening the file is still 100% even though the original and the subsequent file open requests requested to open the file in different access modes.

3.2 Extended Access Modes, Global and Local Coherency Share Modes 3.2.1 Extended Access Modes An access mode for opening a file generally identifies the types of operations that can be performed on the file. The access mode may also be associated with a share mode for opening the file, which indicates whether and what file operations may be simultaneously performed on the file by other clients and/or other users. In addition, an access mode for opening a file may also indicate types of operations that can be performed on attributes of the file, such as, for example, operations that may be performed on the user, group, and other permissions of a file, operations that may be performed on common file attributes (such as size and last-accessed file attributes), and operations affecting Extended Attributes (EA) and Access Control List (ACL) attributes of the file. The access mode for opening a file may also indicate standard, specific, or generic rights to the file, where each of the standard, specific, and generic rights may each be associated with a single user, with groups of users, or with user roles.

In one embodiment that is implemented in the operational context depicted in FIG. 1, the file operations performed by clients, such as client 102A, and supported by local servers, such as local server 104, conform to the Common Internet File System (CIFS) protocol. This embodiment supports three levels of access modes for opening a file, where two of the levels are associated with extended access modes and the third level is associated with the original access mode that a client requests. An access mask encoded according to the requirements of the CIFS protocol identifies the set of operation types indicated by each access mode. In addition, in this embodiment each access mode is associated with a share mask that identifies the share mode in which a file needs to be opened. In this embodiment, the bits in the CIFS mask are combined in the access modes according to the most common combinations that are likely to be used by the clients. Table 1 lists the access modes and their associated share modes that are implemented in this embodiment.

restricted than the Level_3 access mode. If, based on the client request, Level_2 is more restricted than Level_3, then Level_2 is ignored and Level_3 is used instead. The set of types of operations identified by the Level_2 access mode includes the same types of operations as the most extended Level_1 access mode except for the Security type operations. The Level_3 access mode is the original access mode for opening a file that is requested by a client or a client application. Thus, the set of types of operations identified by the Level_3 original access mode includes only the types of operations that are requested by the client, which set may or may not include types of operations that are included in the two more extended access modes. In addition, as shown in Table 1 the access modes used in this embodiment may also be associated with share masks that indicate a share mode for opening a file. This embodiment supports two shared modes, Global Coherency share mode and Local Coherency share mode, which will be described in detail hereinafter.

In other embodiments, the types of file operations available in a file system may be grouped in access modes that are different from the three access modes described above. For example, a separate access mode may be provided for each of the Read, Write, and Security type of operations, which separate access modes would be more restricted than the most extended access mode, which may include all of types of operations. Thus, the three access modes described above are only one example of how types of file operations may be grouped into sets for the purpose of implementing the techniques described herein.

3.2.2 Global and Local Coherency Share Modes

In an embodiment implemented in the operational context depicted in FIG. 1, access modes may also be associated with

TABLE 1

Access Modes According to an Embodiment

| Access Mode | Name | Access Mask and Operation Types | Share mode |
|---|---|---|---|
| Level_1 | Read-Write-Security | Read - data, attributes, EA, ACL<br>Write - data, attributes, EA, append<br>Delete - no delete except on the local server<br>Security - change owner, write DAC | Global Coherency:<br>share read<br>deny write<br>deny delete<br><br>Local Coherency:<br>share7all |
| Level_2 | Read-Write | Read - data, attributes, EA, ACL<br>Write - data, attributes, EA, append<br>Delete - no delete except on the local server | Global Coherency:<br>share read<br>deny write<br>deny delete<br><br>Local Coherency:<br>share-all |
| Level 3 | Original | No change | No change |

As listed in Table 1, in this embodiment the most extended access mode for opening a file is the Level_1 access mode. The set of types of operations identified by this access mode includes: Read operations (reading of file data, file attributes, EA lists, and ACLs); Write operations (writing or appending of file data, file attributes, and EA lists); Security operations (changing of file owner and writing of Discretionary Access-Control (DAC) lists); and Delete operations (no deletion of file data on the file server, but under certain circumstances deletion may be allowed on the local server.)

In this embodiment, the Level_2 access mode is less extended and more restricted than the Level_1 access mode. Depending on the original access mode requested by the client, the Level_2 access mode may or may not be less a Global or Local Coherency share modes for opening a file. Global Coherency mode is an operation mode where direct clients and other local servers can access the same data. Local Coherency mode is an operation mode where the local server is the only entity that is allowed to access the data. In this embodiment, the techniques for reducing client-server messages described herein may be implemented with respect to files that are opened in either of these two share modes.

In Global Coherency mode, in response to a request to open a file from a client such as client 102A, a local server such as local server 104 opens a file on a file server such as file server 114A, for exclusive write access. When a file is opened for exclusive access by a user, no other user is allowed to modify the file. Thus, in this embodiment a file which is opened in Global Coherency mode by a user of a specific client cannot be changed or operated upon by any other servers, clients, or users, including users that may have local access to the file.

In this embodiment, a local server receives a request to open a file from a client. In order to open the file in Global Coherency mode, the local server sets a "deny-write" bit in the access mask that indicates the extended access mode in which the local server wants to open the file. The request to open the file that includes the access mask having the set "deny-write" bit is sent to the file server that manages the file. If the file server grants the request and opens the file in the extended access mode, then the file is opened exclusively and no other server, client, or user will be able to modify the file until the local server closes the file, but other users may be able to read the file's contents or attributes.

In Local Coherency mode, in response to a request to open a file from a client such as client 102A, a local server such as local server 104 opens a file on a file server, such as file server 114A, for shared access. The local server takes responsibility for enforcing all file-sharing related issues. In contrast to setting the "deny-write" bit in Global Coherency mode, in Local Coherency mode all file open requests sent from the local server to the file server are changed to "share-all" by setting the appropriate bits. This means that file open requests can fail at the file server only due to inconsistent permissions, but never because of sharing violations.

In this embodiment, the local server maintains the share mode of every file opened by clients for which the local server acts as a proxy to the file server, and resolves all file-sharing conflicts. Thus, the Local Coherency mode provides for better concurrency and for more performance improvement.

3.3 Opening a File in an Extended Access Mode

In embodiments implemented in the operational context depicted in FIG. 1, the techniques for reducing client-server messages described herein are performed by a local server, such as local server 104. The local server receives a request to open a file from a client. The request includes an original access mask that indicates the original access mode for opening the file as requested by the client. According to the techniques described herein, the local server replaces the original access mask with an access mask that indicates the most extended access mode in which a file server can open the file. The local server then forwards to the file server the request to open the file in the most extended access mode.

In some embodiments, the local server may be configured to determine whether the requested file may be processed according to the techniques described herein. Specifically, the local server may determine whether to request the file server to open the file in the most extended access mode, and whether to cache the response that is received from the file server after the file is opened. For example, good candidates for processing according to the techniques described herein include: regular files, files opened by any client, and files not yet opened according to the techniques described herein. Special files (such as directories, pipes, device files, and links) as well as files that are opened by applications that require special caching or buffering by the file server may not be as good candidates even though the techniques described herein are not restricted to being applied to any particular type of files.

In some embodiments that support file operations that conform to the CIFS protocol, the local server may also turn off specific bits in the original access mask received from the client. For example, the local server may turn off the bits in the CIFS mask that are not relevant to file operations, such as, for example, the Security bit, the Synchronize bit, the Delete Child bit, and the Execute bit.

3.4 Opening a File Locally-Nested Open

In embodiments implemented in the operational context depicted in FIG. 1, a local server, such as local server 104, caches the response received from the file server after the file server has opened the file. The response includes a file handle to the opened file. According to the techniques described herein, the local server caches the received file handle and associates it with a local file handle. The local server maintains and enforces the original access mode that was requested from the client by using the local file handle. The local server then sends the local file handle to the client. Later, the local server may receive another request to open the file from the same client that still holds the local file handle (e.g. before the client has closed the file). This subsequent opening of the file is also referred to herein as a "nested" open.

In some embodiments, the local server may grant a nested open only for files which were previously successfully opened in an extended access mode and for which the file handles received from the respective file servers are still stored in a cache at the local server.

For example, referring to the access modes listed in Table 1, a local server may only grant a nested open of a particular file if the particular file has been previously opened in a Level_1 or Level_2 access mode. In order to determine whether a nested open may be performed on the file, the local server checks whether the file handle received from the file server for the particular file is still stored in the cache. The local server also checks whether there are other local file handles associated with the file (i.e. whether other clients have the file opened locally), and if there are, the local server checks whether opening the particular file in response to the subsequent request from the client will cause a sharing violation with the other clients that have the file opened locally.

In some embodiments, the cached file handle received from the file server may indicate that the file is opened by the file server in an access mode that is more restricted than the most extended access mode available for the client. In these embodiments, in response to a subsequent request for a nested open on the file, the local server may also check whether the access mode indicated in the subsequent request is consistent with the access mode in which the file is opened by the file server, as indicated by the cached file handle. If the subsequently requested access mode is not consistent with the access mode granted by the file server, the local server may deny the nested open.

For example, referring to the access modes listed in Table 1, if the file is opened by the file server in the Level_2 access mode (which does not include Security types of file operations), then the local server will deny any subsequent nested open request to open the file in an access mode that includes a "change owner" or "write DAC" file operation. In another example, if the subsequent nested open request for the file specifies an access mode that indicates a "delete-on-close" file operation, then the request will be denied by the local server unless the file server has opened the file in an access mode that includes a Delete type of file operations.

In some embodiments, the techniques for reducing client-server messages may be implemented with respect to a Local Coherency share mode. In these embodiments, the local server enforces concurrent access to the same file. For example, the local server ensures that two or more different clients may perform subsequent nested opens on the same file without any sharing conflict.

3.5 Opening a File in a Least Restricted Access Mode

In embodiments implemented in the operational context depicted in FIG. 1, a local server, such as local server 104, receives a request to open a file from a local client, such as client 102A. The file is located in a remote LAN, such as LAN 111, and access to the file is managed by a file server, such as file server 114A. The request to open the file indicates an original access mode for opening the file. According to the techniques described herein, in response to receiving the request to open the file, the local server replaces the original access mode in the request with the most extended access mode in which the file server can open the file. The local server then sends the modified request to a remote server that provides a proxy access to the file server, such as remote server 112 depicted in FIG. 1.

Upon receiving the modified request from the local server, the remote server obtains the least restricted access mode for opening the file through a series of fallback attempts. The remote server first requests the file server to open the file in the most extended access mode that is specified in the request received from the local server. If that fails, then the remote server attempts the next least restricted access mode in which the file server can open the file. This process continues until either the file server opens the file in some specific access mode or until the next available least restricted access mode is more restricted than the original access mode that was requested by the client. In this way, the remote server ensures that the file server will open the file in the least restricted access mode. In different circumstances, the least restricted access mode may be the most extended access mode or any access mode that is less extended than the most extended access mode but nevertheless not more restricted than the original access mode requested by the client.

4.0 Implementation Mechanisms—Hardware Overview

Figure 3:
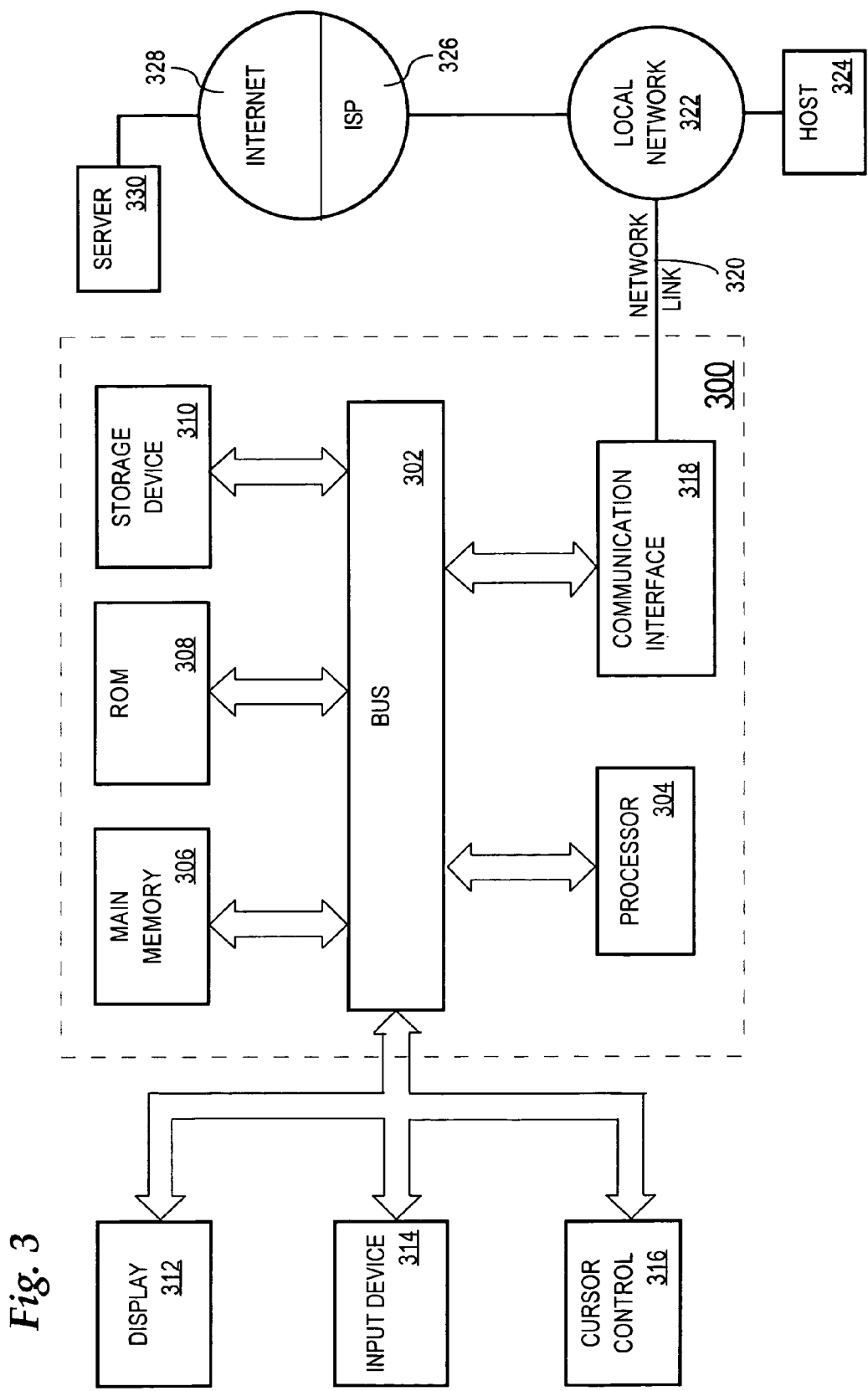
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for reducing client-server messages. According to one embodiment of the invention, reducing client-server messages is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326.

ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for reducing client-server messages as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restricted sense.

What is claimed is:

1. A method of reducing client-server messages, comprising the computer-implemented steps of:
   receiving a first request to open a file, wherein the first request includes first information that indicates a first access mode for opening the file;
   wherein the first request is sent from a client to a file server that manages access to the file;
   modifying the first information to indicate a most extended access mode for opening the file;
   sending the first request with the modified first information to the file server that manages access to the file;
   receiving a first response from the file server, wherein the first response comprises second information which indicates a specific access mode for opening the file that is granted by the file server;
   wherein the specific access mode is different and less restrictive than the first access mode;
   storing the second information in a cache;
   responding to the first request by creating and sending a second response to the client, wherein the second response indicates that the file is opened in the first access mode even though at the file server the file is opened in the specific access mode;
   in response to a second request to close the file, delaying the closing of the file;
   wherein the closing of the file is delayed for a specified interval of time that represents an interval of time during which no requests to open the file have been received; and
   closing the file on the file server after the specified interval of time expires;
   wherein the method is performed by one or more computer systems.

2. A method as recited in claim 1, wherein:
   the most extended access mode identifies a largest set of types of operations, among a plurality of sets ranging from extended to restricted, which are allowed to be performed on the file after the file is opened; and
   the specific access mode is the most extended access mode.

3. A method as recited in claim 1, wherein:
   the first access mode identifies a first set of types of operations that are allowed to be performed on the file after the file is opened;
   the specific access mode identifies a specific set of types of operations that are allowed to be performed on the file after the file is opened, wherein the specific set of types of operations includes at least the first set of types of operations.

4. A method as recited in claim 1, further comprising:
   prior to closing the file on the file server, performing the steps of:
      creating a third response which indicates that the file is closed even though the closing of the file has been delayed; and
      responding to the second request to close the file by sending the third response to the client.

5. A method as recited in claim 1, further comprising:
   receiving a third request to open the file;
   determining whether the file is still open at the file server by determining whether the second information is still stored in the cache; and
   if it is determined that the file is still open, then responding to the third request by creating and sending a third response, wherein the third response is based at least in part on the second information.

6. A method as recited in claim 5, wherein:
   the third request includes third information that indicates a second access mode for opening the file, wherein the second access mode is different than the first access mode;
   each of the first access mode, the second access mode, and the specific access mode identifies a set of types of operations that are allowed to be performed on the file after the file is opened in that access mode; and
   when the set of types of operations identified in the second access mode is included in the set of types of operations identified in the specific access mode, then the third response indicates that the file is opened in the second access mode.

7. A method as recited in claim 5, wherein:
   the first request to open the file, the second request to close the file, and the third request to open the file are associated with a user of the client that sent the first request, the second request, and the third request;
   the second information is associated in the cache with an identifier of the user; and
   the determining whether the second information is still stored in the cache is based at least in part on the identifier of the user.

8. A method as recited in claim 1, wherein the steps are performed by a computer system that executes any of the client and a proxy server.

9. A method of reducing client-server messages, comprising the computer-implemented steps of:
   at a local server, receiving from a client a first request to open a file, wherein the first request includes a first access mask that indicates a first access mode of a plurality of access modes for opening the file, wherein the file is accessed through a remote server that is connected over a communication link;

modifying the first access mask to indicate a most extended access mode from the plurality of access modes for opening the file;

sending the first request with the modified first access mask to the remote server;

receiving a first response from the remote server, wherein the first response comprises a first file handle to the file, wherein the first file handle is associated with a specific access mode of the plurality of access modes for opening the file;

wherein the specific access mode is different and less restrictive than the first access mode;

storing the first file handle in a cache;

responding to the first request by creating and sending a second response to the client, wherein the second response indicates that the file is opened in the first access mode even though the file is opened in the specific access mode at a file server that manages access to the file; and in response to a second request from the client to close the file, delaying the closing of the file;

wherein the closing of the file is delayed for a specified interval of time; and closing the file after the specified interval of time expires and removing the first file handle from the cache;

wherein the method is performed by one or more computer systems.

10. A method as recited in claim 9, further comprising:
prior to closing the file on the file server, performing the steps of:
creating a third response which indicates that the file is closed even though the closing of the file has been delayed; and
responding to the second request to close the file by sending the third response to the client.

11. A method as recited in claim 9, further comprising:
receiving a third request to open the file from the client;
determining whether the file is still open by determining whether the first file handle is still stored in the cache; and
if it is determined that the file is still open, then responding to the third request by creating and sending a third response, wherein the third response includes at least a second file handle that is created based on the first file handle.

12. A method as recited in claim 11, wherein
the third request includes a second access mask that indicates a second access mode of the plurality of access modes for opening the file, wherein the second access mode is different than the first access mode;
each of the plurality of access modes identifies a set of types of operations that are allowed to be performed on the file after the file is opened in that access mode; and
when the set of types of operations identified in the second access mode is included in the set of types of operations identified in the specific access mode, then the second file handle indicates that the file is opened in the second access mode.

13. A method as recited in claim 11, wherein:
the first request to open the file, the second request to close the file, and the third request to open the file are associated with a specific user of one or more users of the client;
the first file handle is associated in the cache with at least a user identifier of the specific user and a client identifier of the client; and the determining whether the first file handle is still stored in the cache is based at least in part on the user identifier and the client identifier.

14. A method as recited in claim 9, wherein:
the first request to open the file and the second request to close the file are associated with a specific user of the client; and
the first request further includes a first data that indicates that no user except the specific user is allowed to perform any operation on the file until the file is closed.

15. A method as recited in claim 9, wherein:
the client is a first client of a plurality of clients that are communicatively connected to the local server;
the first request to open the file and the second request to close the file are sent from the first client; and
the first request comprises:
a first share mask that indicates a first share mode for opening the file; and
a first data that indicates that users of the plurality of clients are allowed to share the file according to the first share mode.

16. A method as recited in claim 9,
the communication link between the local server and the remote server is any one of a dial-up connection, a Wide Area Network (WAN) connection, a Digital Subscriber Line (DSL) connection, and an Integrated Services Digital Network (ISDN) connection;
the client is communicatively connected to the local server over a first Local Area Network (LAN) connection; and
the remote server is communicatively connected to the file server over a second LAN connection, wherein the file server manages access to the file.

17. A method as recited in claim 9, wherein:
the remote server is communicatively coupled to the file server that manages access to the file; and
the remote server determines the specific access mode by successively requesting the file server to open the file in successively different access modes until the file server successfully opens the file, wherein successively requesting comprises starting with the most extended access mode and proceeding to the next least restricted access mode left in the plurality of access modes, wherein that one access mode in which the file is opened successfully is identified as the specific access mode.

18. An apparatus for reducing client-server messages, comprising:
means for receiving a first request to open a file, wherein the first request includes first information that indicates a first access mode for opening the file;
wherein the first request is sent from a client to a file server that manages access to the file;
means for modifying the first information to indicate a most extended access mode for opening the file;
means for sending the first request with the modified first information to the file server that manages access to the file;
means for receiving a first response from the file server, wherein the first response comprises second information which indicates a specific access mode for opening the file that is granted by the file server;
wherein the specific access mode is different and less restrictive than the first access mode;
means for storing the second information in a cache;
means for responding to the first request by creating and sending a second response to the client, wherein the second response indicates that the file is opened in the first access mode even though at the file server the file is opened in the specific access mode;

means for delaying the closing of the file in response to a second request to close the file;

wherein the closing of the file is delayed for a specified interval of time that represents an interval of time during which no requests to open the file have been received; and means for closing the file on the file server after the specified interval of time expires.

19. The apparatus of claim 18, wherein:

the most extended access mode identifies a largest set of types of operations, among a plurality of sets ranging from extended to restricted, which are allowed to be performed on the file after the file is opened; and the specific access mode is the most extended access mode.

20. The apparatus of claim 18, wherein:

the first access mode identifies a first set of types of operations that are allowed to be performed on the file after the file is opened;

the specific access mode identifies a specific set of types of operations that are allowed to be performed on the file after the file is opened, wherein the specific set of types of operations includes at least the first set of types of operations.

21. The apparatus of claim 18, further comprising:

means for creating, prior to closing the file on the file server, a third response which indicates that the file is closed even though the closing of the file has been delayed; and means for responding to the second request to close the file by sending the third response to the client.

22. The apparatus of claim 18, further comprising:

means for receiving a third request to open the file;

means for determining whether the file is still open at the file server by determining whether the second information is still stored in the cache; and means for responding to the third request if it is determined that the file is still open, wherein the means for responding comprise means for creating and sending a third response, wherein the third response is based at least in part on the second information.

23. The apparatus of claim 22, wherein:

the third request includes third information that indicates a second access mode for opening the file, wherein the second access mode is different than the first access mode;

each of the first access mode, the second access mode, and the specific access mode identifies a set of types of operations that are allowed to be performed on the file after the file is opened in that access mode; and when the set of types of operations identified in the second access mode is included in the set of types of operations identified in the specific access mode, then the third response indicates that the file is opened in the second access mode.

24. An apparatus for reducing client-server messages, comprising:

one or more processors; and one or more stored sequences of instructions which, when executed by the one or more processors, cause the one or more processors to perform the steps of:

receiving from a client a first request to open a file, wherein the first request includes a first access mask that indicates a first access mode of a plurality of access modes for opening the file, wherein the file is accessed through a remote server that is connected over a communication link;

modifying the first access mask to indicate a most extended access mode from the plurality of access modes for opening the file;

sending the first request with the modified first access mask to the remote server;

receiving a first response from the remote server, wherein the first response comprises a first file handle to the file, wherein the first file handle is associated with a specific access mode of the plurality of access modes for opening the file;

wherein the specific access mode is different and less restrictive than the first access mode;

storing the first file handle in a cache;

responding to the first request by creating and sending a second response to the client, wherein the second response indicates that the file is opened in the first access mode even though the file is opened in the specific access mode at a file server that manages access to the file;

in response to a second request from the client to close the file, delaying the closing of the file;

wherein the closing of the file is delayed for a specified interval of time; and closing the file after the specified interval of time expires and removing the first file handle from the cache.

25. The apparatus of claim 24, wherein the one or more stored sequences of instructions further comprise instructions which, when executed by the one or more processors, cause the one or more processors to perform the steps of:

prior to closing the file, performing the steps of:

creating a third response which indicates that the file is closed even though the closing of the file has been delayed; and responding to the second request to close the file by sending the third response to the client.

26. The apparatus of claim 24, wherein the one or more stored sequences of instructions further comprise instructions which, when executed by the one or more processors, cause the one or more processors to perform the steps of:

receiving a third request to open the file from the client;

determining whether the file is still open by determining whether the first file handle is still stored in the cache; and if it is determined that the file is still open, then responding to the third request by creating and sending a third response, wherein the third response includes at least a second file handle that is created based on the first file handle.

27. The apparatus of claim 26, wherein:

the third request includes a second access mask that indicates a second access mode of the plurality of access modes for opening the file, wherein the second access mode is different than the first access mode;

each of the plurality of access modes identifies a set of types of operations that are allowed to be performed on the file after the file is opened in that access mode; and when the set of types of operations identified in the second access mode is included in the set of types of operations identified in the specific access mode, then the second file handle indicates that the file is opened in the second access mode.

28. The apparatus of claim 24, wherein:

the first request to open the file and the second request to close the file are associated with a specific user of the client; and the first request further includes a first data that indicates that no user except the specific user is allowed to perform any operation on the file until the file is closed.

29. The apparatus of claim 24, wherein:

the client is a first client of a plurality of clients;

the first request to open the file and the second request to close the file are sent from the first client; and the first request comprises:

a first share mask that indicates a first share mode for opening the file; and a first data that indicates that users of the plurality of clients are allowed to share the file according to the first share mode.

30. The apparatus of claim 24, wherein:

the remote server is communicatively coupled to the file server that manages access to the file; and the remote server determines the specific access mode by successively requesting the file server to open the file in successively different access modes until the file server successfully opens the file, wherein successively requesting comprises starting with the most extended access mode and proceeding to the next least restricted access mode left in the plurality of access modes, wherein that one access mode in which the file is opened successfully is identified as the specific access mode.

* * * * *